US012649655B2

(12) United States Patent
Cuypers et al.

(10) Patent No.: US 12,649,655 B2
(45) Date of Patent: Jun. 9, 2026

(54) WET OXIDATION HYDROGEN PURIFICATION

(71) Applicant: Nederlandse Organisatie voor toegepast-natuurwetenschappelijk onderzoek TNO, 's-Gravenhage (NL)

(72) Inventors: Ruud Cuypers, Rijswijk (NL); Leonard Ferdinand Gerard Geers, Valkenburg (NL); Laurens Daniël Van Vliet, 's-Gravenhage (NL); Arie Jacobus Kalkman, Zwijndrecht (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 963 days.

(21) Appl. No.: 17/760,794

(22) PCT Filed: Sep. 28, 2020

(86) PCT No.: PCT/NL2020/050601
§ 371 (c)(1),
(2) Date: Mar. 16, 2022

(87) PCT Pub. No.: WO2021/060988
PCT Pub. Date: Apr. 1, 2021

(65) Prior Publication Data
US 2022/0332572 A1 Oct. 20, 2022

(30) Foreign Application Priority Data
Sep. 26, 2019 (EP) ...................................... 19199942

(51) Int. Cl.
*C01B 3/10* (2026.01)
*B01J 8/02* (2006.01)

(52) U.S. Cl.
CPC ............... *C01B 3/10* (2013.01); *B01J 8/0278* (2013.01); *B01J 8/0285* (2013.01); *B01J 2208/00309* (2013.01)

(58) Field of Classification Search
CPC .......... C01B 3/105; C01B 3/56; B01J 8/0278; B01J 8/0285; B01J 2208/00309;
(Continued)

(56) References Cited

U.S. PATENT DOCUMENTS

| | | | | |
|---|---|---|---|---|
| 3,140,940 A | * | 7/1964 | Percival | .............. C21B 13/0033 |
| | | | | 75/451 |
| 4,490,349 A | * | 12/1984 | Horvath | .................. C01B 3/061 |
| | | | | 422/240 |
| 2003/0035770 A1 | | 2/2003 | Cole | |

FOREIGN PATENT DOCUMENTS

| | | | | |
|---|---|---|---|---|
| DE | 102017201861 A1 | * | 8/2018 | ............ H01M 8/186 |
| WO | WO-9322044 A2 | * | 11/1993 | ............... C01B 3/10 |

OTHER PUBLICATIONS

Bohn et al. (Production of Very Pure Hydrogen with Simultaneous Capture of Carbon Dioxide using the Redox Reactions of Iron Oxides in Packed Beds, Industrial and Engineering Chemistry Research, 2008) (Year: 2008).*
(Continued)

*Primary Examiner* — Anthony J Zimmer
*Assistant Examiner* — Logan Laclair
(74) *Attorney, Agent, or Firm* — Banner & Witcoff, Ltd.

(57) ABSTRACT

The invention is directed to a process for the purification of a raw hydrogen gas stream comprising hydrogen gas in an amount of 85-99%, said process comprising the step of contacting said raw hydrogen gas stream with an oxidized bed comprising an oxidized metal resulting in a waste gas stream comprising water and less than 5% hydrogen gas, and in a reduction of said oxidized metal; and a step of contacting a bed comprising a reduced metal with water to produce
(Continued)

a purified hydrogen gas stream comprising more than 99% hydrogen gas, preferably comprising 99.97% or more hydrogen gas, and the oxidized metal. In a further aspect, the invention is directed to an apparatus suitable to carry out said process.

18 Claims, 1 Drawing Sheet

(58) Field of Classification Search
CPC ......... Y02E 60/36; Y02E 60/50; Y02E 50/14; C10J 3/72; C10J 3/46; C10J 3/48; C10J 3/50; C10J 2300/0916; C10J 2300/093; C10J 2300/0946; C10J 2300/0959; C10J 2300/1238; C10J 2300/1662; C10J 2300/1807; Y02P 20/145
See application file for complete search history.

(56) References Cited

OTHER PUBLICATIONS

Hyfindr (PEM Fuel Cell, Hyfindr, 2023) (Year: 2023).*

Li et al. (Review on the research of hydrogen storage system fast refueling in fuel cell vehicle, International Journal of Hydrogen Energy, Apr. 2019) (Year: 2019).*

Tong et al. (Continuous high purity hydrogen generation from a syngas chemical looping 25 kWth sub-pilot unit with 100% carbon capture, Fuel, 2013) (Year: 2013).*

Morar et al. (Review: Important contributions in development and improvement of the heat integration techniques, Computers and Chemical Engineering, 2010) (Year: 2010).*

Translation of DE-102017201861-A1 (Year: 2018).*

Luo et al. "Review of hydrogen production using chemical-looping technology", Renewable and Sustainable Energy Reviews 81 (2018) 3186-3214.

Ma et al. "Characterization of Fe2O3/CeO2 oxygen carriers for chemical looping hydrogen generation". Int. J. Hydrogen Energy 43 (2018) 3154-3164.

Hacker, V. "A novel process for stationary hydrogen production: the reformer sponge iron cycle (RESC)". Journal of Power Sources 118 (2003) 311-314.

Takenaka et al. "Storage and formation of pure hydrogen mediated by the redox of modified iron oxides" Applied Catalysis A: General 282 (2005) 333-341.

Acha et al. "Process integration for hydrogen production, purification and storage using iron oxides" Int. J. Hydrogen Energy 39(2014) 5257-5266.

Requies et al. "Process integration for hydrogen production, purification and storage using iron oxides", J Mater Sci (2013) 48:4813-4822.

Nestl et al. "High-Purity Hydrogen Production with the Reformer Steam Iron Cycle", Energy Technol. 2018, 6, 563-569.

* cited by examiner

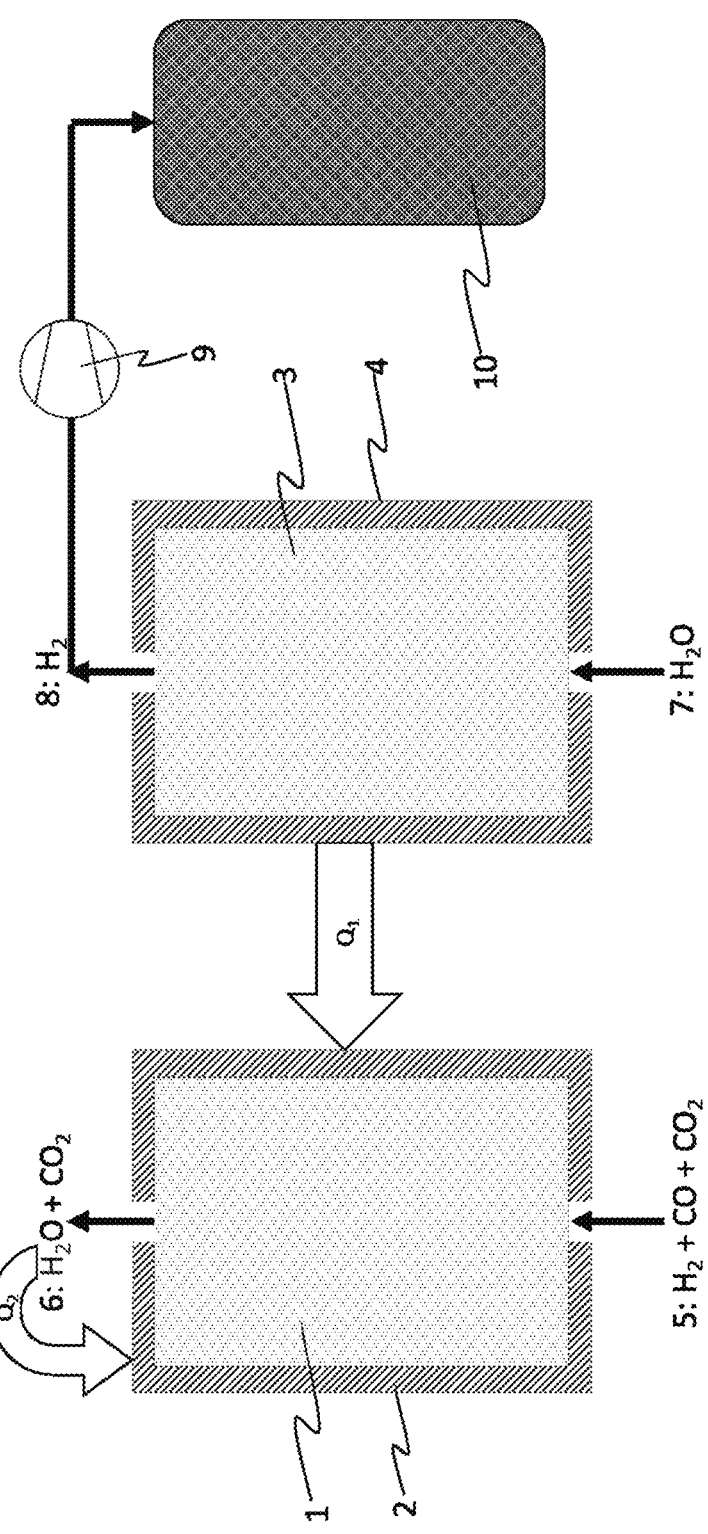

WET OXIDATION HYDROGEN PURIFICATION

RELATED APPLICATIONS

This application is a National Stage Application under 35 U.S.C. 371 of co-pending PCT application PCT/NL2020/050601 designating the United States and filed Sep. 28, 2020; which claims the benefit of EP application Ser. No. 19/199,942.4 and filed Sep. 26, 2019, each of which are hereby incorporated by reference in their entireties.

The invention is in the field of hydrogen gas purification and supply for hydrogen fuel cells such as proton exchange membrane (PEM) fuel cells. In particular, the invention is directed to the purification and supply of hydrogen gas for small-scale and/or decentralized hydrogen-consuming applications such as hydrogen gas refueling stations for vehicles, emergency power supplies, specialty chemicals industry and the like.

In order for hydrogen gas to be suitable for fuel cell technology, it has to meet high standards in terms of purity. Typically, a purity of 99%, preferably of 99.97% and more preferably 99.997% or more is required (see also ISO 14687-2). For the supply of hydrogen gas as an energy source for fuel cells in mobile application such as vehicles, several types of hydrogen gas supply chains have conventionally been proposed and tested.

In Honselaar et al. *International Journal of Hydrogen Energy* 43 (2018) 12278-12294, hydrogen gas refueling stations in the Netherlands are described. The stations in the Netherlands are supplied by hydrogen tube trailers (road transport), water electrolysis, natural gas reformer technology or via a hydrogen pipeline supply. Although, each of these means may provide a hydrogen gas supply of a sufficient purity, they are also each associated with significant drawbacks.

For example, the transportation of sufficiently pure hydrogen gas by tube trailers or a pipeline requires dedicated and expensive infrastructure. This is not only cost ineffective, but also restrictive in terms of the possible hydrogen gas sources that can potentially be used to feed to supply. For instance, impure hydrogen gas originating must always first be purified before it can be used in this infrastructure, which purification may not always be possible or economically viable. Moreover, the prevention of contamination of the hydrogen gas by water, oxygen and/or nitrogen is difficult and it may not be possible to warrant a significantly pure gas supply.

Although the risk of contamination and the need for dedicated infrastructure may be lower in case the hydrogen gas is produced on site at the gas refueling station, this production is also associated with several drawbacks. Natural gas reformer technology such as steam methane reforming (SMR) yields a syn gas which requires significant purification. While this can be achieved with purification technologies such as pressure swing adsorption (also referred to a pressure switch adsorption), the waste gas stream obtained by such purification technologies always contain significant amounts of hydrogen gas (e.g. up to about 20%). In addition, other flammable or harmful gasses may remain in the waste gas stream. Typically, in particular at large industrial sites, such waste gases can be flared. However, flaring at smaller sites such as refueling stations in populated areas is not possible or desirable due to safety risks and environmental pollution. Electrolysis on the other hand results in a sufficiently pure hydrogen gas supply, which could be used directly to fuel the fuel cells without any intermediate purification (except for perhaps a drying step). However, electrolysis is disadvantageously accompanied by a large electricity demand, which demand may not be met, in particular during winter periods.

As an advantageous alternative to the above-mentioned hydrogen gas supplies and to those mentioned in Honselaar et al. in particular, it would be desirable to provide a supply and purification that does not suffer or suffers less from one of the associated drawbacks. In particular, it is desirable to be able to utilized existing gas infrastructures, e.g. at least part of the existing pipe supply lines for natural gas, to transport the hydrogen gas. The present inventors realized that this can be achieved by supplying the hydrogen gas through a pipeline, possibly existing gas infrastructures, and combining this supply with a local purification method. By this combination, the hydrogen gas stream in the pipe line as it is arriving at the refueling station has to meet less stringent requirements in terms of purity. This is not only beneficial in terms of flexibility in the allowable hydrogen gas sources that can be used to feed to supply, but it also poses less stringent requirements on the pipe line infrastructure. For example, when existing gas infrastructures are used, remnants of the previous gas streams (e.g. natural gas) that are adsorbed or absorbed in the infrastructure (including i.a. salt domes and piping) will long remain as pollutants in the hydrogen gas stream. Also, the gases and substances outside the pipeline infrastructure (e.g. water, oxygen, nitrogen and carbon dioxide) may penetrate the pipeline and contaminate the hydrogen gas stream. For traditional gas streams (be it natural or bio-based) this penetration did not form significant problems as the utilization of the gas (burning) posed much lower quality requirements, but considering the high purity of hydrogen gas that is required for its direct use in fuel cells, even small contamination may form problems. By a local, on site purification however, such problems may however be overcome.

Generally, the raw hydrogen gas stream (i.e. the hydrogen gas stream before its purification) as used in the present invention comprises hydrogen gas in an amount of 85-99%. Other constituents that are typically present include carbon monoxide, carbon dioxide, water, oxygen and/or nitrogen. Additional gases, including inert gases such as argon may also be present. The present inventors surprisingly found that this raw hydrogen gas stream can advantageously be purified by reducing a metal oxide with said hydrogen gas stream and subsequently oxidizing the obtained metal with water to provide purified hydrogen gas. The principle behind this purification, albeit in a different context, is described in part in Requies et al. *Journal of Materials Science* 48 (2013) 4813-4822 (which is incorporated herein in its entirety). Requies et al. describe the hydrogen storage capacity of some synthetic and natural iron oxides. Although a purification method for the raw hydrogen gas in accordance with the present invention is not disclosed by Requies et al., the present inventors realized that the method can advantageously be used as such. In particular, the present inventors realized that the waste gas streams that are obtained with this method contain no or very limited amounts of hydrogen gas, in contrast to the typically applied pressure swing absorption technologies.

Although in different contexts and fields, the storage and/or formation of pure hydrogen mediated by iron oxide is also disclosed in Nestl et al., *Energy Technology*, 6, 2018, 563-569, Hacker, *Journal of Power Sources*, 118, 2003, 311-314 and Tekenaka et al., *Applied Catalysis A: General*, 282, 2005, 333-341. Application of this technology for small-scale and/or decentralized hydrogen-consuming applications such as hydrogen gas refueling stations and the like is not disclosed in these documents.

Accordingly, the present invention is directed to a process for the purification and supply of a raw hydrogen gas stream comprising hydrogen gas in an amount of 85-99%, said process comprising the steps of:

a) contacting said raw hydrogen gas stream with an oxidized bed comprising an oxidized metal resulting in a waste gas stream comprising water, carbon dioxide and less than 5% hydrogen gas, and in a reduction of said oxidized metal; and b) contacting a bed comprising a reduced metal with water to produce a purified hydrogen gas stream comprising more than 99% hydrogen gas, preferably 99.97% or more and more preferably comprising 99.997% or more hydrogen gas, and an oxidized metal.

The purified hydrogen gas stream preferably meets the requirements for fuel cell applications as laid down in ISO 14687-2.

Further, it may be appreciated that in accordance with ISO 14687-2, the amount of a particular gas, including that of hydrogen gas, herein refers to its mole fraction, expressed as a percentage (i.e. mol % or simply %), of the total gas stream.

BRIEF DESCRIPTION OF FIGURE

The FIGURE illustrates a setup of the apparatus for the purification of a raw hydrogen gas in accordance with the invention.

In step a) of the present process, the oxidized metal are reduced by the hydrogen gas in the raw hydrogen gas stream. As such, a reduced bed comprising a reduced metal is obtained. Advantageously, the process according to the present invention also allows the upgrading of the raw hydrogen gas stream in case it comprises other reducing gases such as carbon monoxide, methane or other hydrocarbon gases. Accordingly, in a preferred embodiment, the raw hydrogen gas stream further comprises methane. In this embodiment, step a) then also includes oxidizing said methane to carbon dioxide and water utilizing the oxidized bed. As such, the oxidized bed is reduced at least in part by the methane or hydrocarbon gas (and possibly other reducing gases such as CO) and in step b), the obtained reduced can provide hydrogen gas upon contact with water. Accordingly, the methane or hydrocarbon gas is indirectly converted into hydrogen gas and the raw hydrogen gas stream is upgraded. This aspect of the invention is comparable to chemical looping combustion (CLC).

The water that is contained in the waste gas stream coming from step a) can be recycled, optionally including an intermediate purification, for use in step b).

Moreover, any carbon monoxide or other reducing gas that may be present in the raw hydrogen gas stream can advantageously be oxidized to carbon dioxide in step a).

Accordingly, steps a) and b) can chemically be interpreted as follows:

step a) $H_2+CO+CO_2+CH_4+MO_x \rightarrow H_2O+CO_2+MO_y$,
step b) $H_2O+MO_y \rightarrow H_2+MO_x$ wherein $MO_x$ represents the oxidized metal and $MO_y$ represents the reduced metal. It may be appreciated that both $MO_x$ and $MO_y$ may represent a plurality or mixture of various metal species having different oxidation states and that the reduced metal $MO_y$ is not necessarily oxygenated.

Notably, step b) does essentially not provide any products other than $H_2$ and the oxidized metal ($MO_x$). Also, if step a) is effectively carried out by fully converting the input hydrogen, the waste gas stream is essentially free or free of hydrogen gas. In other words, the waste gas stream can comprise less than 5% hydrogen gas, but it preferably comprises less than 1%, more preferably less than 0.1% hydrogen gas.

The oxidized and reduced bed both are typically porous beds such that the gases can efficiently flow through the beds while maintaining a high contact area and reactor capacity. The oxidized metal and reduced metal comprised in the oxidized bed and the reduced bed respectively, are preferably both oxidized metal particles and reduced metal particles. In such case, the oxidized bed and the reduced bed can also be referred to as an oxidized particle bed and a reduced particle bed. The particle beds may be fluidic beds, wherein the particles are mobile and can flow from one reactor compartment or reactor to another reactor compartment or reactor. However, other types of metal beds such as metallic frameworks (e.g. layered grids or three-dimensional frameworks) may also be suitable.

As used herein, the term "oxidized metal" means a metal having an oxidation state that is higher than that of the "reduced metal". Naturally, vice versa, the term "reduced metal" means a metal having an oxidation state that is lower than that of the "oxidized metal". The oxidized and reduced metal thus form a set of two or more oxidations states of at least one metal and/or metal oxides thereof.

The oxidized and reduced metal pair that is used in the present invention can in principle be based on any metal. However, iron oxides and metallic iron is particularly preferred for its high abundance, low cost and favorably high oxidation state (e.g. Fe(III)). In a typical embodiment, the oxidized metal comprises $Fe_3O_4$, while the reduced metal comprise metallic iron, i.e. Fe. As such, steps a) and b) can chemically be interpreted as follows (for sake of conciseness and clarity, the correct stoichiometry in view of $CH_4$ and CO has been omitted for step a):

step a) $Fe_3O_4+4 H_2+CH_4+CO \rightarrow H_2O+CO_2+3$ Fe
step b) $3Fe+4H_2O \rightarrow Fe_3O_4+4H_2$ Besides the metal and/or oxides thereof, the beds may further comprise one or more additives, for instance anti-sintering additives, carriers, support materials and the like. The materials disclosed in Requies et al. *Journal of Materials Science* 48 (2013) 4813-4822 can suitably be used for the present invention.

As described herein above, the raw hydrogen gas stream is not yet sufficiently pure to be directly used in a fuel cell. However, it is neither as impure as the syn gas that is directly obtained from natural gas reformer technology such as steam methane reforming (SMR), which typically has a purity in the range of 7-30%. Generally, the raw hydrogen gas stream is comprising hydrogen gas in an amount of 85-99%, preferably 90 to 98%, more preferably 93 to 97% such as about 95%. In contrast, the purified hydrogen gas stream has a purity of 99% or higher, preferably of 99.97% and more preferably higher than 99.997% and most preferably meeting the requirements of ISO 14687-2, which part of ISO 14687 specifies the quality characteristics of hydrogen fuel in order to ensure uniformity of the hydrogen product as dispensed for utilization in proton exchange membrane (PEM) fuel cell road vehicle systems.

The purified hydrogen gas stream can be supplied directly to the fuel container that is connected to the fuel cell, or it can intermediately be stored in a storage container. As used herein, with the term fuel container is meant a container that is located within or near the fuel cell in which the hydrogen gas is used and which is as such connected to or part of the fuel cell. For instance, if the fuel cell is located in a vehicle, the vehicle can either be directly fueled with the hydrogen gas stream originating from step b) or it can be fueled with hydrogen gas flowing from a storage container on the site of purification. As such, as used herein, with the term hydrogen gas storage container is meant a container that is located at the site of where steps a) and b) are carried out. The hydrogen gas storage container is generally a fixed, immobilized storage facility, while the fuel container may be a mobile container.

Typically, independent on whether the purified hydrogen gas stream is fed to the storage container or to the fuel container, it is first pressurized to increase the energy density $(J/m^3)$ of the gas. Therefore, in a particularly preferred embodiment, the process further comprises a step c) that comprises compressing the purified hydrogen gas stream, preferably to a pressure of at least 100 bar, for instance to a pressure in the range of 200 to 1000 bar or 300 to 800 bar. These pressures are based on typical pressures that are currently applied in hydrogen storage related to fuel cell application in for instance vehicles. Pressurizing may be carried out stepwise, for instance by first pressurizing the gas to 5 bar or higher (e.g. to 50 bar) and then further pressurizing the gas to the above-mentioned ranges. It may be appreciated that the pressure to which the purified gas is preferably compressed may depend on the pressure at which the gas is finally used. Accordingly, pressurizing and storing the gas at lower pressures than 100 bar, e.g. in the range or 2 to 50 bar may also be possible. Notably, in this preferred embodiment of the invention, it is not the reduced metal that is used to store the hydrogen gas (or, in fact, the energy thereof) and to release it just before use as disclosed in Requies et al. *Journal of Materials Science* 48 (2013) 4813-4822. In contrast, the gist of this embodiment is that the hydrogen gas itself is stored. The purpose of the reduced and oxidize metal is to purify the raw hydrogen gas stream. Storing large amounts of the hydrogen gas (or, in fact, the energy thereof) and to release it just before use as disclosed in Requies et al. would require a large capacity of the particle beds.

In a particularly preferred embodiment of the present invention, steps a) and b) are carried out simultaneously. As such, it appears that the raw hydrogen gas stream that is processed is directly converted into a purified hydrogen gas stream. It may be appreciated however that in this embodiment, step a) and b) are carried out with at least two different particles beds. Thus, although the reduced bed is converted into an oxidized bed in step a), step b) is carried out with another oxidized bed at that moment. This embodiment can for instance be carried out in an apparatus comprising at least two reactors, each containing a bed, as is described in more detail herein below. The advantage of this embodiment is that there is not required to store a large amount of purified hydrogen gas in order to be able to meet high purified gas demands. If a high gas demand presents itself, the raw hydrogen gas stream can be purified at that moment. The maximum flow capacity can readily be increased by using more than two reactors or by increasing the flow capacity of the individual reactors. For instance, if the present process is carried out at a hydrogen refueling station, it can be ensured that the flow capacity of the purification process is at least equal to the flow capacity which with it is possible to fuel the vehicles. As such, even if a longer period of a high demand presents itself, delivery of the purified hydrogen gas stream can be guaranteed, provided there is sufficient raw hydrogen gas. However, if the process is connected to a large raw hydrogen gas pipeline infrastructure (which is preferred), the pipeline infrastructure can serve as a buffer or reservoir providing sufficient raw hydrogen gas. The storage container may however still be preferred to absorb small fluctuation in in- and output of the raw and purified hydrogen gas stream respectively.

In yet further preferred embodiments of the present invention, heat that is generated is at least partially recycled into a part of the process where heat is required. As such, the overall efficiency of the process is increased. Heat may be generated in several parts of the process. For example, the reduction of the oxidized metal in step a) is possibly an endothermic reaction requiring the input of heat. Accordingly, in a preferred embodiment, heat that is generated in step b) is at least partially used for said reduction of the oxidized metal in step a).

Another exchange of heat can take place between the waste gas stream and the reduction of the oxidized metal in step a). Generally, step a) is carried out at a temperature in the range of 200 to 900° C., preferably in the range of 300 to 700° C. such as about 500° C. As such, the waste gas stream has an elevated temperature, typically in the range at which step a) is carried out. In a typical embodiment of the invention, the waste gas stream is emitted into the air. However, emitting the waste gas stream at an elevated temperature would mean an undesirable loss of heat from the process. Accordingly, in a preferred embodiment of the invention, heat is extracted from the waste gas stream and at least partially used in said reduction in step a). This can be carried out using one or more heat exchangers.

Compressing the purified hydrogen gas stream generally requires the input of heat, albeit that the inherent inefficiency of the compressor may already produce sufficient heat to heat the compression process. However, depending on the pressure and temperature to which the purified hydrogen gas is compressed, the compression may also coincide with the generation of heat, which heat can be at least partially led to and used in step a). Therefore, there may be a heat exchange between the compression process steps of the purified gas stream and other process steps to optimize the efficiency of the process. For instance, if the compression and gas storage require or may benefit from additional heat input, said heat can at least partially be provided by using the heat generated in step b) (in case of an exothermic oxidation of the reduced metal).

In the embodiments wherein compressing the purified hydrogen gas stream result in cooling of the purified hydrogen gas, it may however actually be preferred to maintain this cooling and to not provide additional heat from other process steps. For instance, if the purified hydrogen gas is stored at a pressure of more than 700 bar (e.g. 900 bar), fueling a vehicle with the gas to a lower pressure (e.g. 700 bar) will typically result in a temperature increase of the gas (due to the Joule-Thomson effect). As such, the hydrogen gas in the fuel gas container of the vehicle will initially be of a high temperature an the gas will inherently be cooled by the environment (which will continue also after the fueling has been finished), due to which the pressure in the fuel container of the vehicle will drop. The result is that the vehicle contains less gas (i.e. gas at a lower pressure) than it could have been charged with and thus that it has been fueled to a sub-optimal driving range. This principle may be prevented by cooling the hydrogen gas upon fueling, such that the hydrogen gas entering the fueling container is of a lower temperature which will lead to no, or at least less, pressure decrease. This cooling may however make the overall process less energy efficient. Advantageously, by compressing the purified hydrogen gas and thereby cooling the purified gas stream, less or no additional cooling may be required when the vehicle is fueled. As such, compressing the purified hydrogen gas stream in step c) preferably coincides with cooling the purified hydrogen gas stream. This may enable more efficient and/or more rapid fueling of vehicles.

As for step a), step b) is preferably also carried out at a temperature in the range of 200 to 900° C., preferably in the range of 300 to 700° C. such as about 500° C. It is possible that steps a) and b) are carried out at about the same temperature, or at different temperatures. A consequence of carrying out step b) at an elevated temperature is that the temperature of the pure hydrogen gas that is generated is also elevated. In fact, the temperature of the gas is typically the same as the temperature at which step b) is carried out.

An advantage of carrying out steps a) and b) simultaneously, as described above, is that this facilitates the heat exchange between these steps. It removes or reduces the requirement to intermediately store heat obtained from one part of the process before it can be provided to the other part of the process. Simultaneously carrying out steps a) and b) thus also facilitates the heat integration of these steps.

In the embodiments wherein step b) is carried out at elevated temperatures, it is particularly preferred to pre-heat or pre-pressurize the water that is used in this step. The water used in this step is preferably steam. A suitable pressure to which the water can be pressurized is in the range of 20 to 50 bar such as about 30 bar. Pre-heating the water can efficiently be done out by using the heat generated in step b) (in case of an exothermic oxidation of the reduced metal) and/or by the heat of the water in the waste gas stream.

In a further aspect, the present invention is directed to an apparatus for the purification and supply of the raw hydrogen gas stream. The apparatus is particularly suitable to carry out the process as described herein-above. The apparatus comprises at least a first reactor comprising an oxidized material bed comprising oxidized metal material (e.g. particles) or a reduced material bed comprising reduced metal material (e.g. particles), said first reactor further comprising a gas inlet and a gas outlet, which gas outlet is connected to a hydrogen gas storage container via a compressor that suitable for compressing hydrogen gas. The inlet of the reactor is preferably connected to a hydrogen gas supply pipe line infrastructure.

In a preferred embodiment, the apparatus further comprises at least a further second reactor that comprises an oxidized bed comprising an oxidized metal or a reduced bed comprising a reduced metal, wherein said first reactor is connected to said second reactor via a heat exchanger such that during operation heat that is generated in the first reactor can be exchanged to the second reactor and vise-versa.

Figure illustrates a setup of the apparatus in accordance with a preferred embodiment. The first reactor (2) comprises the bed 1. When reactor 2 is in the state to process raw hydrogen gas, the bed 1 is at least partially the oxidized bed as described above. The raw hydrogen gas (indicated in Figure as containing $H_2$, CO and $CO_2$) can flow through the reactor entering in gas inlet (5). Then, upon full conversion of the hydrogen, the waste gas stream (indicated in Figure as containing $H_2O$ and $CO_2$) can leave the first reactor (2) through outlet 6. In a particularly preferred embodiment, the heat from the waste gas stream can be recycled into the first reactor (2) or parts thereof (indicated in Figure with $Q_2$). A preferred part of the first reactor to which the heat ($Q_2$) is led is the gas inlet (5), which allows the heating the raw hydrogen gas when or just before this gas stream enters the first reactor (2). The second reactor 4 comprises the bed 3. When reactor 4 is in the state to convert water to the purified hydrogen gas, the bed 3 is at least partially the reduced bed as described above. The water (indicated in Figure as $H_2O$) can flow through the reactor entering in gas inlet (7). Then, upon full conversion of the water, the purified hydrogen gas stream (indicated in Figure as containing $H_2$) can leave the reactor 4. In a particularly preferred embodiment, the heat from the oxidation of the reduced metal is recycled into the first reactor (2) or parts thereof (indicated in Figure with $Q_1$). A preferred part of the first reactor to which the heat ($Q_1$) is led is the gas inlet (5), which allows the heating the raw hydrogen gas when or just before this gas stream enters the first reactor (2). The purified hydrogen gas stream can leave reactor 4 through outlet 8 and be led to the storage tank (10) after it has been compressed by a compressor (9). Thus, reactor 4 is preferably connected to the storage tank (10) via the compressor (9).

As described herein-above in more detail for the process, the process for which the apparatus is dedicated may comprise various heat exchanges to optimize the process. In Figure as described above, some of these heat exchanges have explicitly been described. It may be appreciated that for other embodiments the apparatus may comprise alternative or additional means to facilitate the exchange of heat in the apparatus. For instance, the heat from the waste gas stream can also be recycled to the gas inlet (7), which allows the pre-heating the water (e.g. to form steam) before it enters the second reactor (4). Also, the heat from the oxidation of the reduced metal in the second reactor (4) may be recycled to the gas inlet (7) for this reason.

In another particularly preferred embodiment, e.g. the heat from the compression of the purified hydrogen gas stream is recycled into first reactor (2).

In particularly preferred embodiment, the particle beds are included in the reactors in cartridges for an easy replacement of the particle beds.

It may be appreciated that the role of reactors 2 and 4 can be alternated. As such, reactor 4 can be used to purify the raw hydrogen gas stream and reactor 2 can be used to reduce the water to the purified hydrogen gas stream. Accordingly, both reactor 2 and 4 are preferably connected to the storage tank (10) via outlets 6 and 8 respectively and which reactor is actually used to lead the hydrogen gas stream to the compressor can be regulated by one or more valve systems (not illustrated). Similarly, both reactor 2 and 4 are preferably connected to the hydrogen supply pipe line via inlets 5 and 7 respectively. Moreover, the apparatus according to the invention can be controlled such that reactors 2 and 4 can be run simultaneously for an improved heat integration ($Q_1$ and $Q_3$ in particular). An additional advantage of simultaneously running the reactors and timely alternating their functions, is that the apparatus can effectively be run continuously. To this end, it may also be preferred that the apparatus comprises more than two reactors, for instance 4 or 5, or even more reactors. If the apparatus comprises more than two reactors, this would allow a preparation time between two cycles (i.e. steps a) and b)) while still operating the apparatus continuously (i.e. letting in a continuous flow of raw hydrogen gas and yielding a continuous flow of purified hydrogen gas). This preparation time can for example be used to purse the reactor or to bring it to a desired temperature and/or pressure.

In an alternative embodiment to alternating the role of reactors 2 and 4, a fluidized bed of particles can be circulated, similarly to a chemical looping combustion process. In a process and apparatus according this embodiment, the oxidized bed in reactor 2 can be reduced and after reduction be transferred to reactor 4, wherein it is again oxidized by the water. After its oxidation, the particles can again be transferred to reactor 2. As such, the process can also be carried out continuously.

The process and apparatus described herein are not necessarily limited to providing a purified hydrogen gas stream for application in hydrogen fuel cells. Other application that use or may benefit from the pure hydrogen gas stream can also be linked to the present process and apparatus. For instance, the raw hydrogen gas stream may also be purified by the process and the apparatus described herein to provide the purified hydrogen gas stream for use of the hydrogen gas as a reducing agent in chemical industry, for applications requiring a very clean hydrogen gas flame, for applications utilizing hydrogen plasma of a very high purity, and the like.

As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features.

For the purpose of clarity and a concise description features are described herein as part of the same or separate embodiments, however, it will be appreciated that the scope of the invention may include embodiments having combinations of all or some of the features described.

The invention claimed is:

1. A process for producing a stream of pure hydrogen, said process comprising the steps of:
   a) contacting a raw hydrogen gas stream comprising hydrogen gas in an amount of 85-99 mol % with an oxidized bed comprising an oxidized metal, at least resulting in a waste gas stream comprising water and less than 5 mol % hydrogen gas, and in a reduction of said oxidized metal to produced a reduced metal; and
   b) contacting a bed comprising the reduced metal with water to at least produce a purified hydrogen gas stream comprising more than 99 mol % hydrogen gas, and oxidizing the reduced metal to form the oxidized metal wherein said raw hydrogen gas stream further comprises one or more further reducing gases, and wherein step a) includes oxidizing said reducing gas to a higher oxidation state utilizing the oxidized bed.

2. The process according to claim 1, said process further comprising a step c) that comprises compressing the purified hydrogen gas stream to a pressure in the range of 200 to 1000 bar.

3. The process according to claim 2, wherein said compressed purified hydrogen is stored in a hydrogen gas storage container.

4. The process according to claim 1, wherein said purified hydrogen gas stream is fed to and stored in a fuel container that is connected to a hydrogen fuel cell.

5. The process according to claim 1, wherein steps a) and b) are carried out simultaneously.

6. The process according to claim 1, wherein heat is generated in step b) and which heat is at least partially used in step a).

7. The process according to claim 1, wherein step a) is carried out at a temperature in the range of 200 to 900° C. and wherein the waste gas stream has an elevated temperature, and wherein heat is extracted from the waste gas stream, which heat is at least partially used in step a).

8. The process according to claim 1, wherein the raw hydrogen gas stream comprises hydrogen gas in an amount of 90 to 98 mol %.

9. The process according to claim 1, wherein the oxidized metal comprises iron oxides and wherein the reduced metal comprises metallic iron.

10. The process according to claim 1, wherein the waste gas stream comprises less than 1 mol % hydrogen gas.

11. An apparatus for the purification of a raw hydrogen gas stream in accordance with claim 1, said apparatus comprising at least a first reactor comprising an oxidized bed comprising an oxidized metal or a reduced bed comprising a reduced metal, said first reactor further comprising a gas inlet and a gas outlet, which gas outlet is connected to a hydrogen gas storage container via a compressor that is suitable for compressing hydrogen gas.

12. The apparatus according to claim 11, wherein the inlet is connected to a hydrogen gas supply pipe line.

13. The apparatus according to claim 11, said apparatus comprising at least a further second reactor that comprises an oxidized bed comprising the oxidized metal or a reduced bed comprising the reduced metal, wherein said first reactor is connected to said second reactor via a heat exchanger such that during operation heat that is generated in the first reactor can be exchanged to the second reactor and vise-versa.

14. The process according to claim 1 wherein the purified hydrogen gas stream comprises 99.97 mol % or more hydrogen gas.

15. The process according to claim 1 wherein the one or more further reducing gases comprises carbon monoxide or methane.

16. The process according to claim 1 wherein the purified hydrogen gas is compressed.

17. The process according to claim 1 wherein the purified hydrogen gas is compressed and stored in a fuel container that is located in a vehicle.

18. The process according to claim 1 wherein the waste gas stream has an elevated temperature in the range at which step a) is carried out.

* * * * *